(No Model.) 2 Sheets—Sheet 2.
N. P. & J. W. LEHR.
CULTIVATOR.
No. 436,667. Patented Sept. 16, 1890.
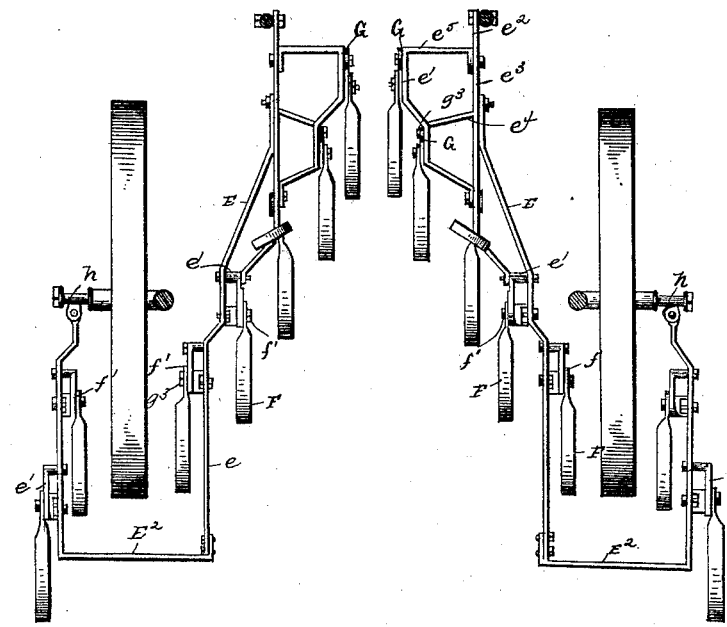
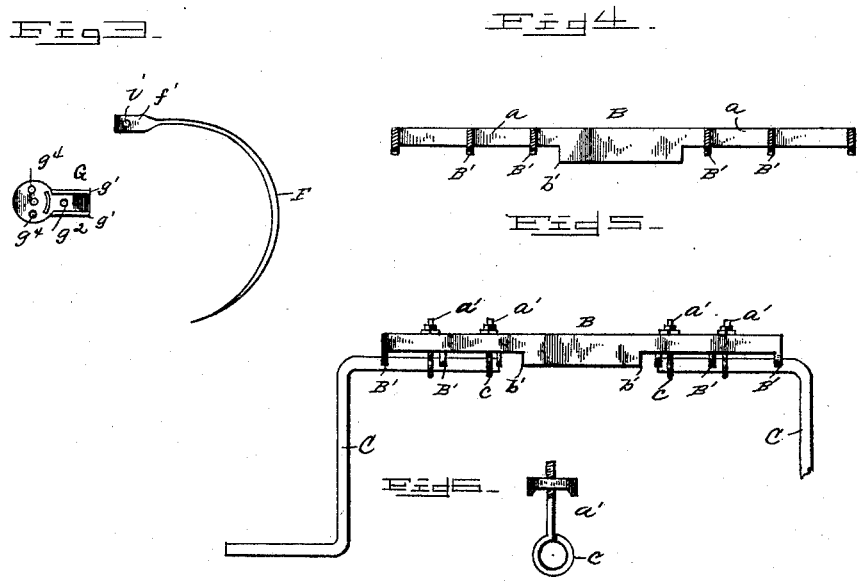

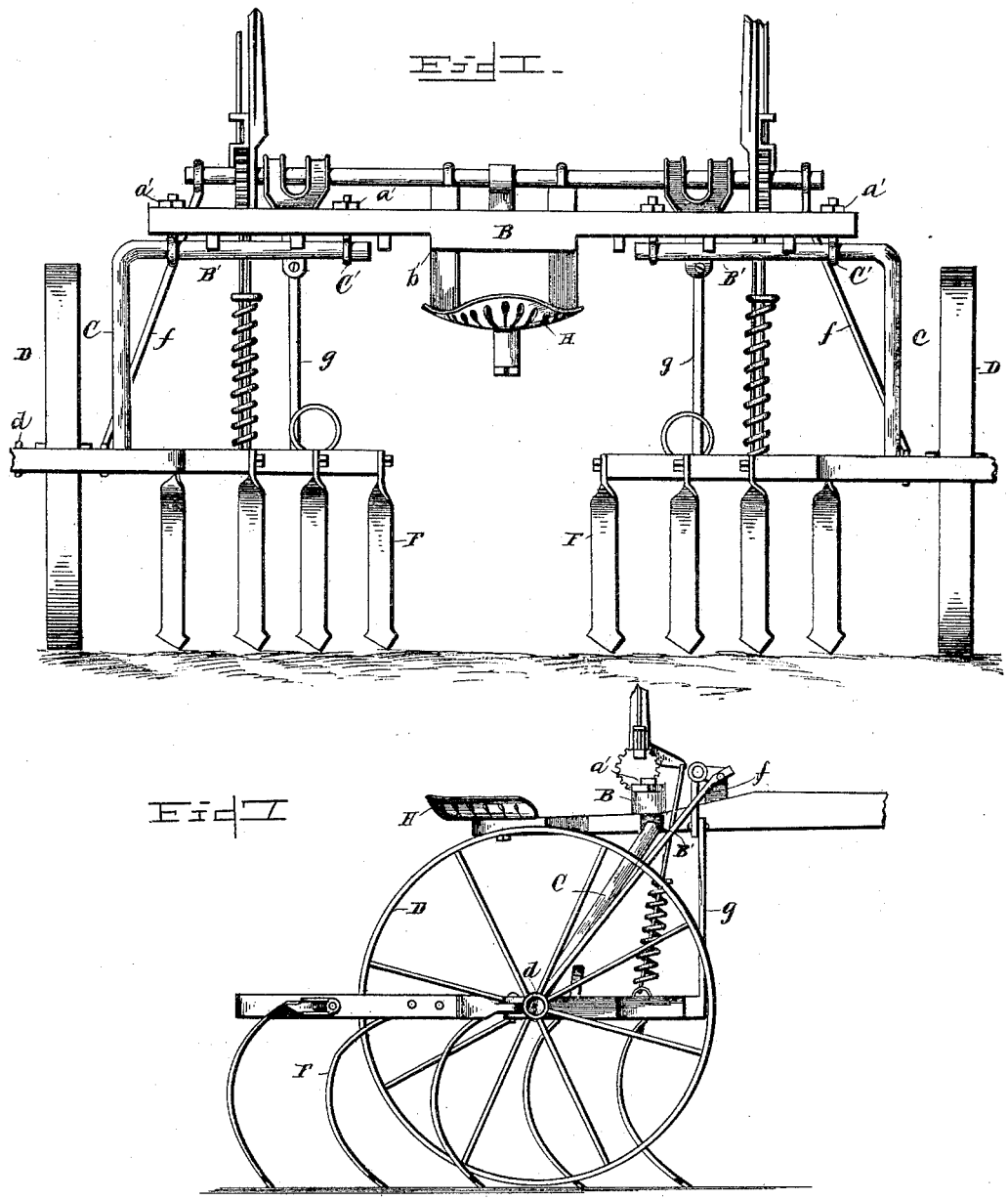

UNITED STATES PATENT OFFICE.

NICHOLAS P. LEHR AND JOSEPH W. LEHR, OF FREMONT, OHIO.

CULTIVATOR.

SPECIFICATION forming part of Letters Patent No. 436,667, dated September 16, 1890.

Application filed September 27, 1889. Serial No. 325,259. (No model.)

*To all whom it may concern:*

Be it known that we, NICHOLAS P. LEHR and JOSEPH W. LEHR, citizens of the United States of America, residing at Fremont, in the county of Sandusky and State of Ohio, have invented certain new and useful Improvements in Cultivators, of which the following is a specification, reference being had therein to the accompanying drawings.

This invention contemplates certain improvements in cultivators which are convertible into ordinary corn-cultivators or adapted for cultivating purposes in vineyards or orchards; and it consists of the novel combination and construction of parts, as will fully appear from the following description and accompanying illustrations, in which—

Figure 1 is a rear elevation of our improvement. Fig. 2 is a detached view of one feature of our invention. Fig. 3 is a detailed side elevation of one of our cultivator-teeth and its fastener. Fig. 4 is a side elevation of our axle-yoke and beam. Fig. 5 is a sectional view thereof, and Fig. 6 is a side elevation of one of the securing-bolts. Fig. 7 is a side elevation of our invention.

In carrying out our invention we employ a suitable carrying-frame A, which has the usual draft pole or tongue for a two-horse team and the other necessary equipments therefor; but, as we make no claim to these, further reference thereto is unnecessary herein.

B is a yoke, which consists of parallel pieces and is centrally secured upon the rear end of the draft pole or tongue A, said yoke having a central slot $a$, through which passes two bolts $a'$, also passing down through and bolted to the diverging portions of the pole or tongue. Upon the under side of the pieces of the yoke B are fastened notched plates B', which project edgewise from and stand at short intervals apart along the said pieces, at each side of central enlargements $b'$ of the latter. From the ends of the enlargements $b'$ depend slight flanges $b^2$ $b^2$, which hug the sides of the rear end portions of the pole or tongue and thus prevent any possible lateral displacement of the yoke thereon. This yoke is also designed to be adjustable to permit cultivation between wide and narrow rows of plants in orchards.

C C are two axles, each of which is a double right-angle or of proximate Z shape, the upper arm resting in the notched edgewise-disposed plates B', and secured to the yoke B by means of eyebolts $c$, the eyes of the latter receiving said arm, and the bolts passing through and clamped upon said yoke.

Upon the lower arms of the axles C C are placed spindles $d$, which carry the transporting or carrying wheels D D, while connection is made between said spindles and the frame A at suitable points thereon by rods or braces $f f$. The upper ends of the braces pass through the frame A, and are each provided with a series of apertures which engage a common connecting-rod $f'$, by means of which the point of connection between the said rod and ends of the braces may be varied to provide for the adjustment of the axles as may be desired in bringing the carrying-wheels nearer together or placing them farther apart.

E E are two beams of peculiar construction connected to the lower ends of pendent rods or hangers $g$, in turn connected to the lower side of a cross-bar of the frame A. Each beam E is formed throughout with alternating short offsets or bends $e'$ and straight portions $e$, the offsets or bends having the same general inclination, the same being inward, the beams thus converging at their forward ends and widely diverging at their rear ends. Bolted to the straight portion $e^2$ of each beam, just in rear of the second offset $e'$ from the forward end, is a straight bar $e^3$ extending forward and making the connection between the pendent or hangers $g$ and the beam, and with the forward end of the same straight portions $e^2$ is formed an outward and slightly forwardly inclined arm $e^4$, while at the extreme front end of the beam is an arm $e^5$, standing at right angles thereto. These arms $e^4$ and $e^5$ are bolted at their outer ends to the straight bar $e^3$, thus providing a point of attachment for the beams in the frame thereof while causing their forward ends to be inclined or stand inward. A brace is also bolted at one end to the straight bar $e^3$, while its other end is bolted to the straight portion $e^2$, next to the last or rearmost offset $e'$ of the beam, thus bracing or strengthening the latter. The rear end of each beam E has bolted to it a right angle or curved section or bar $E^2$, which stands behind the wheel and connects outside of the same with the outer end of the axle-spindle by means of a clevis-like collar $h$, the collar being slipped on the spindle, while between the cheek-pieces of the clevis or rear portion is pivoted or bolted the forward end of said right-angle section or bar E. This sectional bar has also offset and straight portions $e'$ $e^2$, as shown. These clevis-like collars permit the beam-sections $E^2$ to have vertical or lateral movement, rendering the same yielding to accommodate them to unevenness of travel, &c.

F F are spring cultivator-teeth, one each being suitably bolted or connected to each straight portion $e^2$ of the beams E and the bars or section $E^2$, whereby series of teeth are arranged at short intervals apart and out of alignment with each other throughout the machine as also upon the outside of the carrying-wheels, permitting cultivation in orchards between and close to the trees or vines or stems. It is also obvious that the implement is equally adapted for ordinary cultivation in the open field. The teeth are at their inner or securing ends $f'$ formed with a half-twist, causing the same to stand edgewise to the tooth proper, and said edgewise portions are each provided with a bolt-receiving hole $i$, and is fitted in an arc-attaching device or socket G, having parallel flanges $g'$ $g'$ upon one side at the edges, between which is received said end of tooth. The socket or attaching device G has also an aperture $g^2$, registering with the aperture or hole in the inner end $f'$ of the tooth F, and through these registering holes or apertures is inserted a securing or fastening bolt $g^3$, held securely in place by its head and a nut. The socket or attaching device G has a series of vertical adjusting apertures or holes $g^4$, by means of which, with the aid of a bolt, the socket or attaching device is secured adjustably to the beam E to permit the teeth to have more or less depth of penetration in soil and thus vary the draft of the same. It will be observed that by removing the outside teeth the remaining teeth between the carrying-wheels will constitute a perfect corn-cultivator, either the gangs of spring-teeth or shovel-plows being used, as may be required.

H is the driver's seat suitably mounted in position upon the frame A, while applied to the beams E are stirrups I, to receive the feet of the driver, enabling the exertion of pressure upon the beams as well as providing rests for the feet.

Having thus fully described our invention, what we claim, and desire to secure by Letters Patent, is—

1. In a cultivator, the adjustable yoke composed of two parallel bars having integral therewith the cross-pieces or partitions with concave seats, in combination with the bent axles and the eyebolts, substantially as shown and described.

2. In a cultivator, the tooth formed of a single piece of metal and twisted near its upper end to form a securing end, in combination with the frame, and the adjusting-plate having flanges which overlap the tooth, and a series of adjusting-apertures, substantially as shown and described.

3. In a cultivator, the beams having the offsets or bends and the straight sections, and the sections to the straight portion of which are secured the series of offsets carrying the fasteners to which are secured the teeth, substantially as shown and described.

4. The combination, with the cultivator frame and wheels, of the tooth-frame having the straight portion, to the rear ends of which are attached adjustable approximately L-shaped frames passing around the rear of the wheels and secured to the wheel-spindles and carrying the teeth on their outer ends, substantially as shown and described.

In testimony whereof we affix our signatures in presence of two witnesses.

NICHOLAS P. LEHR.
J. W. LEHR.

Witnesses:
E. S. HAMILTON,
GEO. J. WIDEMAN.